United States Patent
Petit

[11] 3,845,835
[45] Nov. 5, 1974

[54] ELECTRIC POWER PLANT FOR LAND VEHICLES

[76] Inventor: Earl W. Petit, 2713 N.E. 21st. Ave., Fort Lauderdale, Fla. 33306

[22] Filed: Mar. 14, 1973

[21] Appl. No.: 341,030

[52] U.S. Cl.................................. 180/65 R, 290/16
[51] Int. Cl............................................... B60k 1/00
[58] Field of Search........... 180/65 R, 65 A; 320/61; 290/14, 15, 16, 17, 45, 40 D, DIG. 10; 318/139

[56] References Cited
UNITED STATES PATENTS

| | | | |
|---|---|---|---|
| 778,133 | 12/1904 | Keates........................... | 180/65 R X |
| 827,766 | 8/1906 | Weiss.............................. | 180/65 A |
| 1,175,535 | 3/1916 | Lister........................ | 180/65 R UX |
| 3,374,849 | 3/1968 | Redman........................... | 180/65 R |
| 3,477,536 | 11/1969 | Carini.............................. | 180/65 F |
| 3,530,356 | 9/1970 | Aronson..................... | 180/65 R UX |

FOREIGN PATENTS OR APPLICATIONS

| | | | |
|---|---|---|---|
| 514,351 | 1/1938 | Great Britain.................... | 180/65 R |

Primary Examiner—David Schonberg
Assistant Examiner—David M. Mitchell
Attorney, Agent, or Firm—Oltman and Flynn

[57] ABSTRACT

An electric power plant for a land vehicle which includes: an electric motor; two alternators driven by the motor; a voltage regulator for the alternators; and two sets of batteries charged alternately through the regulator. The battery that is not being charged energizes the motor. The alternators are on the drive axle of the vehicle.

4 Claims, 3 Drawing Figures

PATENTED NOV 5 1974　　　　　　　　　　　　3,845,835

ELECTRIC POWER PLANT FOR LAND VEHICLES

BACKGROUND OF THE INVENTION

The air polluting characteristics of internal combustion engines have led to proposals for various alternative types of power plants for passenger cars and other automotive vehicles. For example, U.S. Pat. No. 3,367,438 to Moore discloses a vehicle power plant having an internal combustion engine and an electric motor which are used alternatively as the motive power source for the vehicle. Also, various battery-powered vehicles have been proposed.

SUMMARY OF INVENTION

The present invention is directed to a novel and improved battery-operated power plant for land vehicles.

A principal object of this invention is to provide a novel and improved electric power plant for land vehicles which has two sets of batteries that alternately energize an electric drive motor on the vehicle.

Another object of this invention is to provide such a power plant having a novel arrangement for charging the batteries from voltage generating machines driven by the electric motor.

Another object of this invention is to provide such a power plant in which the batteries are charged through alternators located at the vehicle-propelling rear axle of the vehicle.

Further objects and advantages of this invention will be apparent from the following detailed description of a presently-preferred embodiment thereof, which is illustrated in the accompanying drawing in which.

Figure 1:
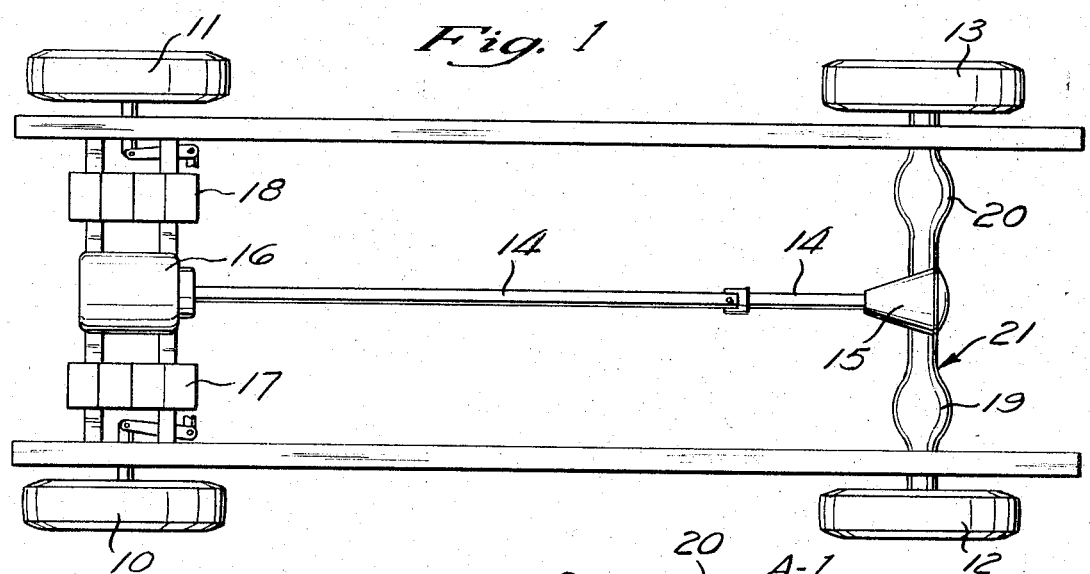
FIG. 1 is a top plan view of an electric power plant on a passenger car in accordance with the present invention.

Referring first to FIG. 1, the present power plant is shown schematically, installed on a passenger car having front wheels 10 and 11, rear wheels 12 and 13 by which the car is propelled, and a drive shaft 14 for driving the rear wheels 12 and 13 through a differential 15.

In accordance with the present invention, the usual internal combustion engine is replaced by an electric motor 16 that is energized alternately by two sets of batteries 17 and 18. The motor and both sets of batteries are located at the front of the vehicle, and the motor is coupled to the front end of the drive shaft 14. At the rear axle of the vehicle are located a pair of voltage generating machines, preferably alternators, which are located inside respective enlargements 19 and 20 in the rear axle housing 21.

Figure 2:
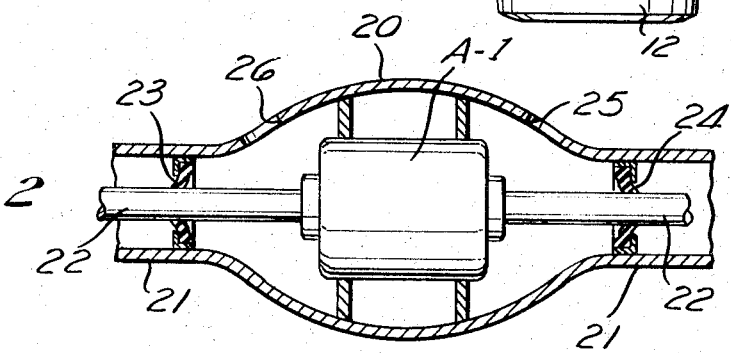
FIG. 2 is an enlarged longitudinal sectional view showing the rear axle mounting of one of the alternators in this power plant.

Referring to FIG. 2, one of the alternators, A-1, is shown positioned within the housing enlargement 20. The rear axle 22, which is driven from the drive shaft 14 through the differential 15, is suitably coupled to the rotor of the alternator. Seals 23 and 24 act between the rear axle 22 and its housing 21 inboard and outboard from the alternator A-1. The axle housing enlargement 20 has an air inlet opening 25 at the outboard side of the alternator A-1 and an air outlet opening 26 at the inboard side.

Preferably, the bottom of the axle housing enlargement 20 where the alternator A-1 is located is removably attached in any suitable fashion, so as to enable ready access to the alternator for servicing or replacement.

The second alternator is mounted in the same fashion at the other enlargement 19 in the rear axle housing on the opposite side of the differential 15.

Figure 3:
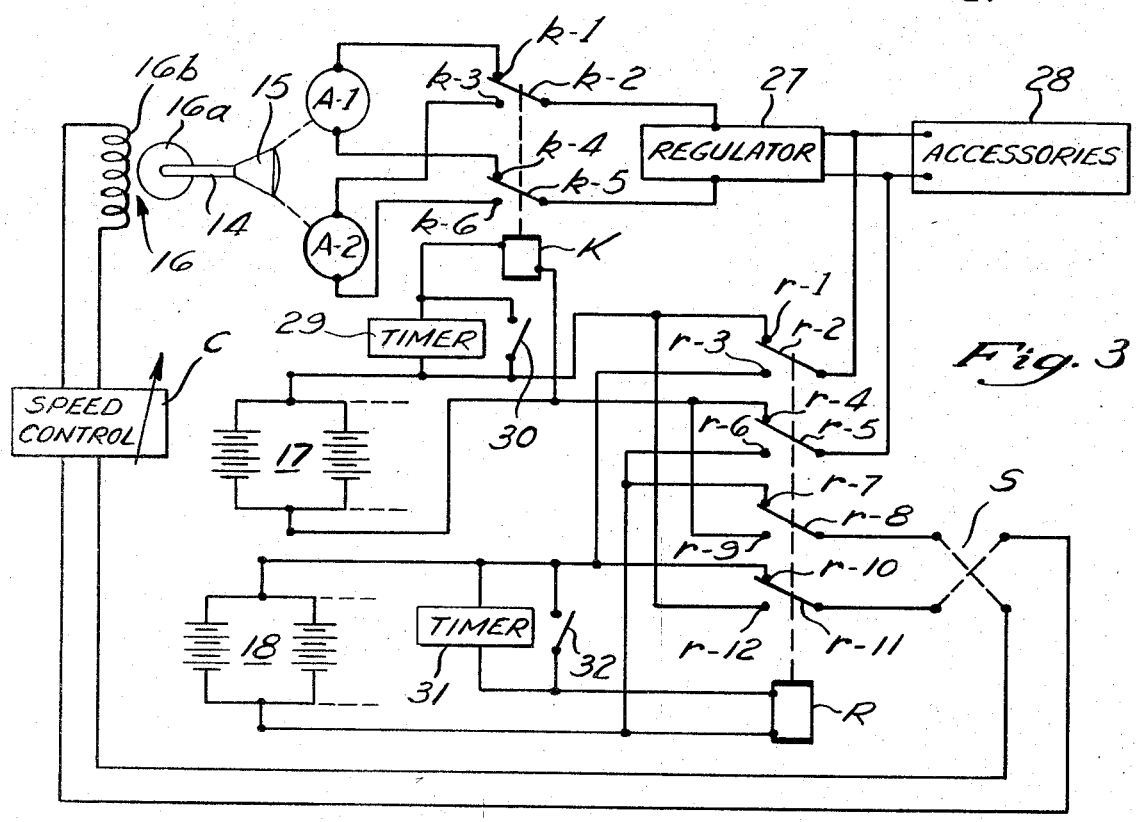
FIG. 3 is a schematic electrical circuit diagram of this power plant.

Referring now to FIG. 3, the two alternators A-1 and A-2 are shown coupled to the rotor 16a of the vehicle drive motor 16 through the drive shaft 14 and the differential 15. The output of the alternator A-1 may be connected across the input of a voltage regulator 27 through the fixed upper contacts $k$-1 and $k$-4 and the corresponding mobile contacts $k$-2 and $k$-5 of a first relay having an operating coil K. Alternatively, the output of the other alternator A-2 may be connected across the input of regulator 27 through respective lower contacts $k$-3 and $k$-6 and the mobile contacts $k$-2 and $k$-5 of this relay when its operating coil K is energized.

Thus, when relay coil K is de-energized, as shown, alternator A-1 is connected to the regulator 27 and alternator A-2 is disconnected from the regulator. Alternatively, when relay coil K is energized, alternator A-2 is connected to the regulator 27 and the other alternator A-1 is disconnected from the regulator.

The energization of relay coil K is controlled by a timer 29 and a manual switch 30 connected in parallel with each other between one terminal of one set of batteries 17 and one terminal of relay coil K. The opposite terminal of relay coil K is connected to the opposite terminal of the battery set 17. If either the timer 29 or the switch 30 is closed, relay coil K will be energized; if neither is closed, relay coil K will be de-energized.

The output of the regulator 27 is connected to various electrically operated accessories 28 on the vehicle, such as lamps, an air conditioner, cigarette lighter, etc.

The output of regulator 27 also is connected across either the first set of batteries 17 or the second set of batteries 18, depending upon whether or not the operating coil R of a second relay is energized. As shown, with the relay coil R de-energized, the regulator output is connected across the first set of batteries 17 through the mobile relay contacts $r$-2 and $r$-5 and corresponding upper fixed contacts $r$-1 and $r$-4. Alternatively, when relay coil R is energized, its mobile contacts $r$-2 and $r$-5 engage respective lower fixed contacts $r$-3 and $r$-6 to connect the regulator output across the second set of batteries 18. With this arrangement, at any given time one set of batteries or the other is connected to be charged through the voltage regulator 27, while the remaining set of batteries is disconnected from the regulator.

The second relay coil R also operates two additional sets of contactts for determining which set of batteries 17 or 18 is connected across the field winding 16b of the vehicle drive motor 16 to energize the motor. In these two additional sets of relay conatcts, the upper fixed contacts $r$-7 and $r$-10 are connected respectively to opposite terminals of the set of batteries 18, and the lower fixed contacts $r$-9 and $r$-12 are connected respectively to opposite terminals of the set of batteries 17. The respective mobile contacts $r$-8 and $r$-11 are connected through a reversing switch S and a variable speed control C of any suitable type to the field winding 16b of the motor. With this arrangement, the motor field winding is connected to be energized by whichever of the two sets of batteries 17 or 18 is then disconnected from the voltage regulator 27. The reversing switch S determines the direction of operation of the drive motor 16, and the speed control C determines its speed.

The energization of the coil R of the second relay is controlled by a timer 31 and a manual switch 32, which are connected in parallel with each other between one terminal of the set of batteries 18 and one terminal of relay coil R. The opposite terminal of relay coil R is connected to the opposite terminal of the set of batteries 18. If either the timer 31 or switch 32 is closed, relay coil R will be energized; if neither is closed, relay coil R will be de-energized.

The two timers 29 and 31 may be interconnected so as to change over simultaneously between an electrically closed state and an electrically open state, so that each set of batteries is charged only by a particular alternator A-1 or A-2. Alternatively, the two timers may be set to open and close independent of one another. Normally, each timer will be closed 50 percent of the time, whatever the period of its operating cycle.

The manual switches 30 and 32 normally will be open, and the vehicle operator will close them only when the timer-controlled energization of the corresponding relay coil K or R is unsatisfactory for some reason.

From the foregoing description, it will be apparent that the disclosed embodiment constitutes a completely electrically-energized power plant for land vehicles in which the different sets of batteries alternately energize the drive motor and are charged from the motor-driven alternators. However, while a presently-preferred embodiment of this invention has been disclosed, it is to be understood that various modifications and refinements may be adopted which depart from the particular embodiment disclosed.

I claim:

1. In a vehicle having vehicle-propelling wheels, drive axle means for driving said wheels, an electric drive motor for driving said drive axle means, two sets of batteries for energizing the motor alternately, two voltage generating machines mounted on said drive axle means to be driven therewith for alternately charging said sets of batteries through a regulator, and selective means for connecting the set of batteries which is not being charged to the motor for energizing the motor while disconnecting from the motor the other set of batteries and connecting the said other set to the regulator to be charged, the improvement comprising:

first relay means for selectively coupling one said voltage generating machine or the other to the regulator for charging the selected battery, and operating circuit means for operating said relay means and said selective means.

2. The combination as claimed in claim 1 in which said selective means comprises second relay means.

3. The combination as claimed in claim 2 in which said operating circuit means includes first and second timer means respectively coupled to said first annd second relay means for controlling the times at which said first and second relay means are energized and de-energized.

4. The combination as claimed in claim 3 in which said drive axle means includes apertured housings respectively enclosing said two voltage generating machines, and seals for said housings for sealing each voltage generating machine in a ventilated enclosure.

* * * * *